United States Patent
Malston

(10) Patent No.: US 10,875,624 B2
(45) Date of Patent: Dec. 29, 2020

(54) CARBON FLOCKED TAPE

(71) Applicant: Toyota Tsusho America, Inc., New York, NY (US)

(72) Inventor: Travis A. Malston, Lexington, KY (US)

(73) Assignee: Toyota Tsusho America, Inc., New York, NY (US)

( * ) Notice: Subject to any disclaimer, the term of this patent is extended or adjusted under 35 U.S.C. 154(b) by 651 days.

(21) Appl. No.: 15/403,537

(22) Filed: Jan. 11, 2017

(65) Prior Publication Data

US 2017/0204296 A1 Jul. 20, 2017

Related U.S. Application Data

(60) Provisional application No. 62/279,790, filed on Jan. 17, 2016.

(51) Int. Cl.
*B64C 1/40* (2006.01)
*B32B 7/12* (2006.01)
(Continued)

(52) U.S. Cl.
CPC .............. *B64C 1/40* (2013.01); *B32B 3/263* (2013.01); *B32B 5/02* (2013.01); *B32B 5/14* (2013.01);
(Continued)

(58) Field of Classification Search
CPC .......... B32B 2405/00; B32B 2262/106; B32B 25/10; B32B 27/12; B32B 5/14; B32B 3/263; B32B 5/145; B32B 15/14; B32B 5/02; B32B 25/04; B32B 27/06; B32B 15/04; B32B 15/20; B32B 15/18;
(Continued)

(56) References Cited

U.S. PATENT DOCUMENTS 5,595,801 A * 1/1997 Fahy .................... H05K 9/0003
156/272.2
6,106,920 A 8/2000 Pichon et al.
(Continued)

FOREIGN PATENT DOCUMENTS

EP 0162645 A1 11/1985

OTHER PUBLICATIONS

Upright, Definiton of Upright, www.merriam-webster.com/dictionary/upright, retreived Jul. 30, 2020.*
(Continued)

*Primary Examiner* — Jennifer A Gillett
(74) *Attorney, Agent, or Firm* — Christopher G. Darrow; Darrow Mustafa PC

(57) ABSTRACT

Arrangements related to carbon flocked tape are described. The flocked tape can include a first adhesive, a substrate, a second adhesive, and a plurality of fibers. The substrate can be formed from any suitable metal, polymer, and/or natural material. The fibers can be formed from milled recycled carbon fibers. The carbon fibers can be connected within the tape via an electrostatic flocking process. The flocked tape can allow for application, removal, and re-application. The carbon flocked tape can provide several benefits, such as electric and/or thermal conductivity, noise and vibration reduction, insulation and shielding, and altered fluid dynamics.

14 Claims, 9 Drawing Sheets

(51) Int. Cl.
| | |
|---|---|
| B32B 15/04 | (2006.01) |
| B32B 15/18 | (2006.01) |
| B32B 15/20 | (2006.01) |
| B32B 27/06 | (2006.01) |
| B32B 25/04 | (2006.01) |
| B60R 13/08 | (2006.01) |
| B60K 11/08 | (2006.01) |
| F01N 1/24 | (2006.01) |
| F01D 25/14 | (2006.01) |
| F01N 1/04 | (2006.01) |
| C08K 3/04 | (2006.01) |
| F01N 13/14 | (2010.01) |
| F02C 7/045 | (2006.01) |
| C09J 7/22 | (2018.01) |
| C09J 7/38 | (2018.01) |
| B32B 15/14 | (2006.01) |
| B32B 5/02 | (2006.01) |
| B32B 3/26 | (2006.01) |
| B32B 37/12 | (2006.01) |
| B32B 5/14 | (2006.01) |
| B32B 27/12 | (2006.01) |
| B32B 25/10 | (2006.01) |
| B60K 13/04 | (2006.01) |
| B64C 1/06 | (2006.01) |
| B05D 1/14 | (2006.01) |
| F01N 3/28 | (2006.01) |
| B05D 1/06 | (2006.01) |

(52) U.S. Cl.
CPC ............... *B32B 5/145* (2013.01); *B32B 7/12* (2013.01); *B32B 15/04* (2013.01); *B32B 15/14* (2013.01); *B32B 15/18* (2013.01); *B32B 15/20* (2013.01); *B32B 25/04* (2013.01); *B32B 25/10* (2013.01); *B32B 27/06* (2013.01); *B32B 27/12* (2013.01); *B32B 37/12* (2013.01); *B60K 11/08* (2013.01); *B60K 13/04* (2013.01); *B60R 13/08* (2013.01); *B64C 1/066* (2013.01); *C08K 3/046* (2017.05); *C09J 7/22* (2018.01); *C09J 7/38* (2018.01); *F01D 25/145* (2013.01); *F01N 1/04* (2013.01); *F01N 1/24* (2013.01); *F01N 13/14* (2013.01); *F02C 7/045* (2013.01); *B05D 1/06* (2013.01); *B05D 1/14* (2013.01); *B32B 2250/02* (2013.01); *B32B 2255/02* (2013.01); *B32B 2255/06* (2013.01); *B32B 2255/10* (2013.01); *B32B 2255/20* (2013.01); *B32B 2255/26* (2013.01); *B32B 2262/106* (2013.01); *B32B 2307/102* (2013.01); *B32B 2307/202* (2013.01); *B32B 2307/206* (2013.01); *B32B 2307/212* (2013.01); *B32B 2307/302* (2013.01); *B32B 2307/304* (2013.01); *B32B 2307/3065* (2013.01); *B32B 2307/58* (2013.01); *B32B 2307/582* (2013.01); *B32B 2307/5825* (2013.01); *B32B 2307/71* (2013.01); *B32B 2307/732* (2013.01); *B32B 2405/00* (2013.01); *B32B 2603/00* (2013.01); *B32B 2605/00* (2013.01); *B32B 2605/08* (2013.01); *B32B 2605/18* (2013.01); *B60Y 2306/09* (2013.01); *C09J 2201/134* (2013.01); *C09J 2201/606* (2013.01); *C09J 2205/102* (2013.01); *C09J 2400/163* (2013.01); *C09J 2400/226* (2013.01); *C09J 2421/006* (2013.01); *F01N 3/2871* (2013.01); *F01N 2260/20* (2013.01); *F01N 2510/02* (2013.01); *F01N 2510/04* (2013.01); *F05D 2260/231* (2013.01); *F05D 2260/96* (2013.01); *F05D 2300/224* (2013.01); *F05D 2300/614* (2013.01); *Y02T 50/672* (2013.01); *Y02T 50/675* (2013.01)

(58) Field of Classification Search
CPC . B32B 7/12; B32B 2307/102; B32B 2250/02; B32B 2255/02; B32B 2605/00; B32B 2603/00; B32B 2307/732; B32B 2307/71; B32B 2307/5825; B32B 2307/582; B32B 2307/58; B32B 2307/304; B32B 2307/302; B32B 2307/206; B32B 2307/202; B32B 2255/26; B32B 2255/06; B32B 2255/10; B32B 2307/212; B32B 2605/08; B32B 2605/18; B32B 2255/20; B32B 2307/3065; C08K 3/046; B64C 1/40; B64C 1/066; B60K 13/04; B60K 11/08; C09J 7/38; C09J 7/22; C09J 2201/134; C09J 2400/226; C09J 2201/606; C09J 2205/102; C09J 2421/006; C09J 2400/163; F02C 7/045; F01N 1/04; F01N 13/14; F01N 1/24; F01N 3/2871; F01N 2260/20; F01N 2510/04; F01N 2510/02; B60R 13/08; F01D 25/145; Y02T 50/672; Y02T 50/675; B60Y 2306/09; F05D 2300/224; F05D 2260/96; F05D 2300/614; F05D 2260/231; B05D 1/14; B01D 1/14; B01D 1/16
USPC .................................... 442/150, 151; 428/90
See application file for complete search history.

(56) References Cited

U.S. PATENT DOCUMENTS

| | | |
|---|---|---|
| 6,119,573 A | 9/2000 | Berens et al. |
| 6,331,343 B1 | 12/2001 | Perez et al. |
| 7,318,619 B2 | 1/2008 | Munro et al. |
| 2004/0213942 A1* | 10/2004 | Sano ............... C09J 7/403 428/40.1 |
| 2005/0163963 A1 | 7/2005 | Munro et al. |
| 2012/0301716 A1* | 11/2012 | Terada ............. C09J 7/00 428/355 AC |
| 2013/0260171 A1* | 10/2013 | Harkins ........... C09D 5/24 428/607 |

OTHER PUBLICATIONS

Breur, "Flock-outperforming Toxic Antifouling for Ships", Micanti, Undated presentation.

* cited by examiner

CARBON FLOCKED TAPE

CROSS REFERENCE TO RELATED APPLICATIONS

This application claims benefit of U.S. Provisional Application No. 62/279,790, filed on Jan. 17, 2016, which is herein incorporated by reference in its entirety.

FIELD

The subject matter described here in relates in general to the process of flocking and, more particularly, to tape flocked with carbon fibers.

BACKGROUND

Flocking is the process of applying many fine particles or fibers to a surface. The fibers are generally oriented in such a way that the fibers extend in a direction away from the flocked surface to create a different texture to a surface. Flocking has been used in a variety of industries to offer increased tactile sensation, improved aesthetics, thermal, sound, or electrical insulation, varied frictional characteristics, and lower light reflectivity, as examples.

Fibers can be applied to surfaces using several techniques, such as the use of adhesives and electrostatic processes. Typical flocking processes can include applying an adhesive layer to a physical object and then applying several nylon fibers to the adhesive layer, which results in a substantially permanent flocked surface.

SUMMARY

In one respect, the subject matter described herein is directed to carbon flocked tapes. Instead of flocking a surface by applying an adhesive or glue material to a physical object and then applying fibers at the angle or orientation desired to the physical object, this flocked tape can allow a person or machine to flock a surface with fibers more quickly and/or easily by simply applying or connecting the flocked tape to the surface of an object. The tape can be flocked with carbon fibers that can be of shorter lengths than fibers from traditional materials. A substrate of the tape can be used that either conduct or insulate heat and/or electricity. The flocked tape can have different types of adhesives for adhering the flocked tape to the surface of an object. In some examples, the adhesive can allow the flocked tape to be substantially permanently and quickly connected to a surface. In other examples, an adhesive can be used that allows the flocked tape to be moved or rearranged on the surface of the object before "setting." Some embodiments can allow the flocked tape to be removable from the surface of the object when so desired.

In one example configuration, the tape can include a substrate and a first adhesive applied to an inner surface of the substrate. The tape can further include a second adhesive applied to an outer surface of the substrate. The tape can also include a plurality of carbon fibers, with each carbon fiber having a first end and a second end. The first ends can be connected via the second adhesive. The second ends can extend away from the second adhesive end.

In another example configuration, the subject matter described herein is directed to a carbon flocked tape. The tape can include a substrate having an inner and an outer surface, and a first adhesive applied to the inner surface of the substrate. The first adhesive can be a pressure sensitive adhesive (PSA). The tape can also include a second adhesive applied to the outer surface of the substrate. The tape can further include a plurality of carbon fibers having a first end retainably engaged in the second adhesive. The carbon fibers can also have a second end extending away from the substrate at a substantially random orientation. Both virgin and recycled milled carbon fibers can be used.

In still yet another example configuration, the subject matter described herein is directed to a method for producing a carbon flocked tape. The method can include applying a flocking adhesive to an outer surface of a substrate. The tape can include an attachment adhesive pre-applied to an inner surface of the substrate. The method can further include retainably engaging a first end region of each of a plurality of milled carbon fibers to the second adhesive such that the plurality of milled carbon fibers extend away from the second adhesive.

DETAILED DESCRIPTION

Figure 1:
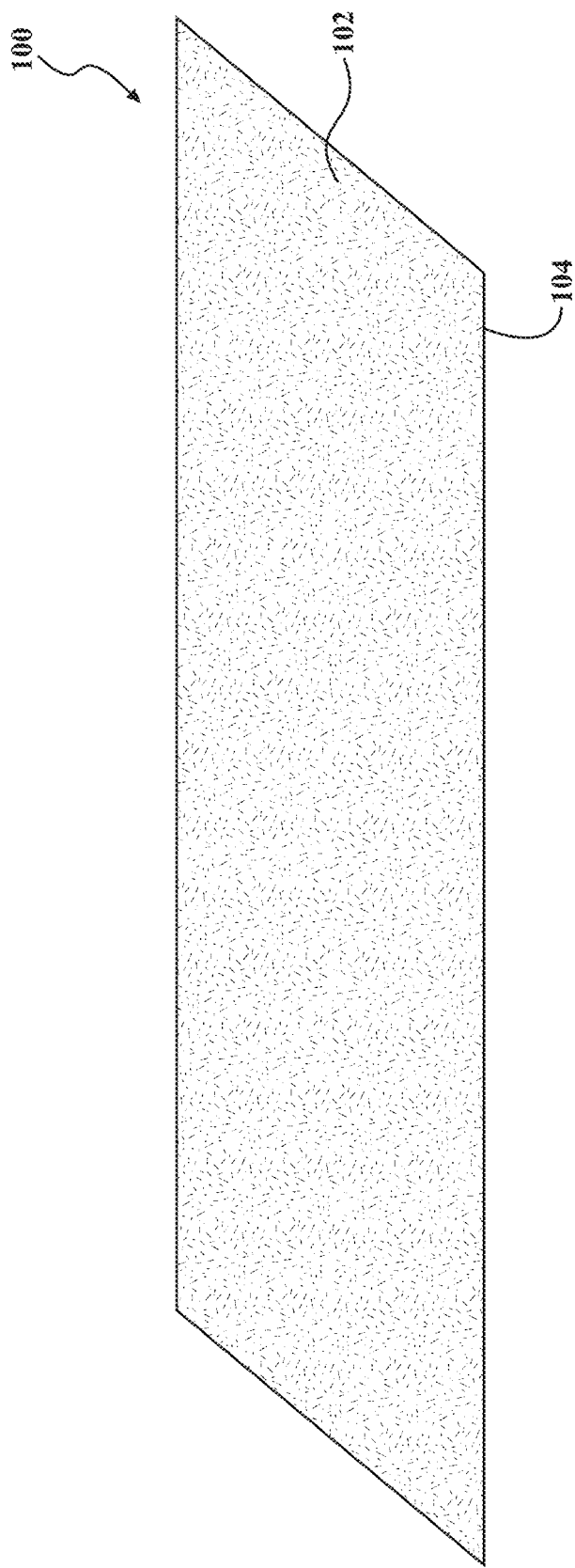
FIG. 1 is an example of a carbon flocked tape.

This detailed description relates to carbon flocked tapes. The flocked tape can allow for both permanent and non-permanent ways to quickly add a flocked surface. For example, rather than applying fibers to a surface using traditional flocking methods, the flocked tape can be applied directly to the surface. In some arrangements, the flocked tape can then be removed to return the surface to its original configuration. Arrangements described can provide beneficial changes to aerodynamics and fluid flow at an applied surface. For example, the flocked tape can be applied to surfaces to reduce fluid friction near the applied surface. Further, based on the material selections of the substrate, the carbon flocked tape can provide electric and/or thermal conductivity and/or resistance. The flocked tape can also provide noise, vibration, and harness (NVH) benefits such as reducing the transfer of noise and/or vibrations. In yet other examples, the flocked tape can provide insulation from radiation within an electromagnetic spectrum. Further, arrangements described can shield and protect a surface that the tape is applied to.

In one or more arrangements, the tape can include a first adhesive configured to allow the tape to be connected to any desired surface. A flocking adhesive can be applied to the outer surface of either the first adhesive or the substrate. A plurality of carbon fibers can be flocked to the substrate by retainably engaging the fibers with the flocking adhesive. The described technology relates to tapes and methods for forming tapes that incorporate one or more of such features.

Detailed embodiments are disclosed below; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIGS. 1-4 show an example of a carbon flocked tape 100. Some of the possible elements of the tape 100 are shown in FIGS. 1-4 and will now be described. It will be understood that it is not necessary for the tape 100 to have all of the elements shown in FIGS. 1-4 or described herein. The tape 100 can include an outer surface 102 and an inner surface 104. The terms "outer", "outside", "inner" and "inside" are used throughout this description for convenience only and are not intended to be limiting.

In one or more arrangements, the outer surface 102 can include a flocked surface. As used herein, "flocked surface" or "flocking" can include a surface having a collection of fiber particles. In one or more arrangements, the inner surface 104 can include an adhesive to allow the tape 100 to be connected to one or more surfaces.

Figure 2:
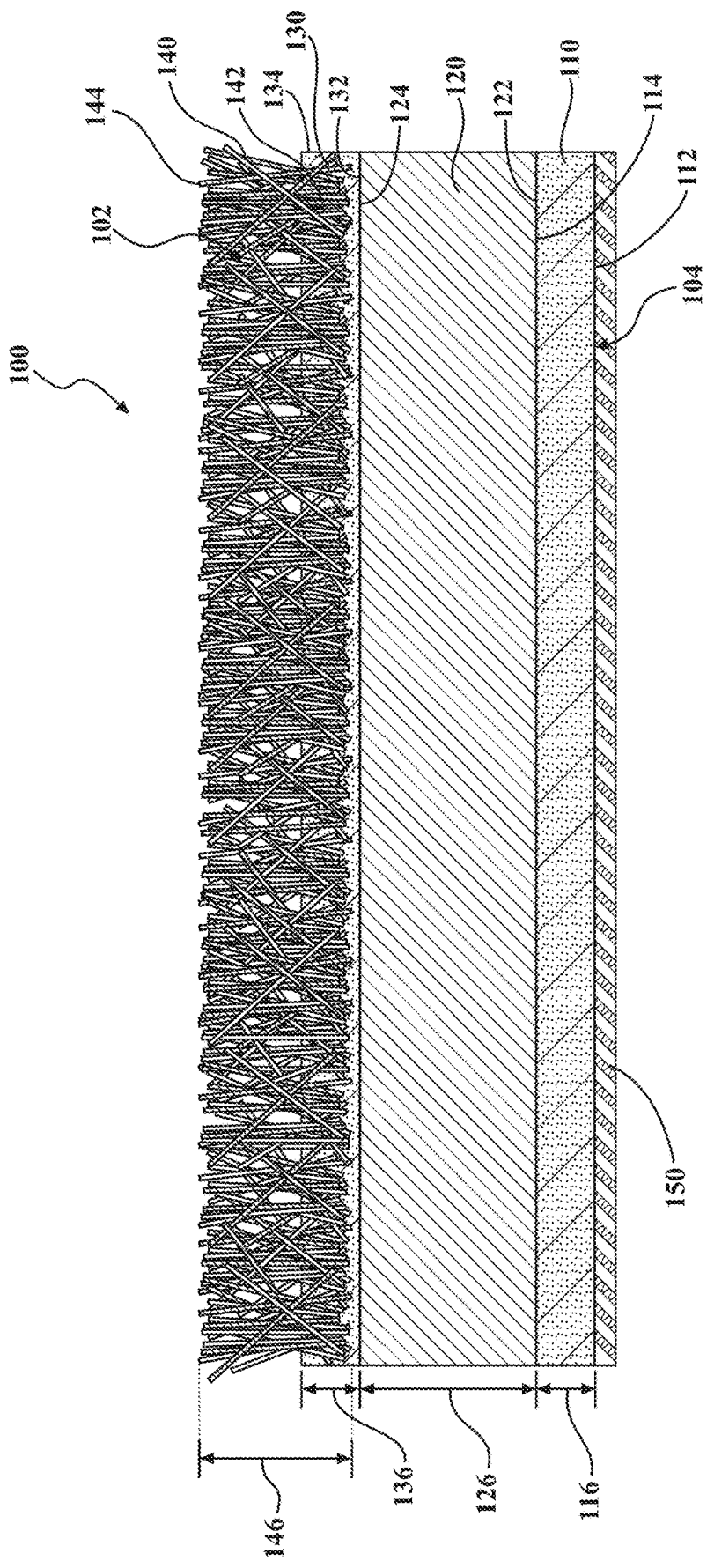
FIG. 2 is a partial cross sectional view of a first example carbon flocked tape.
Figure 3:
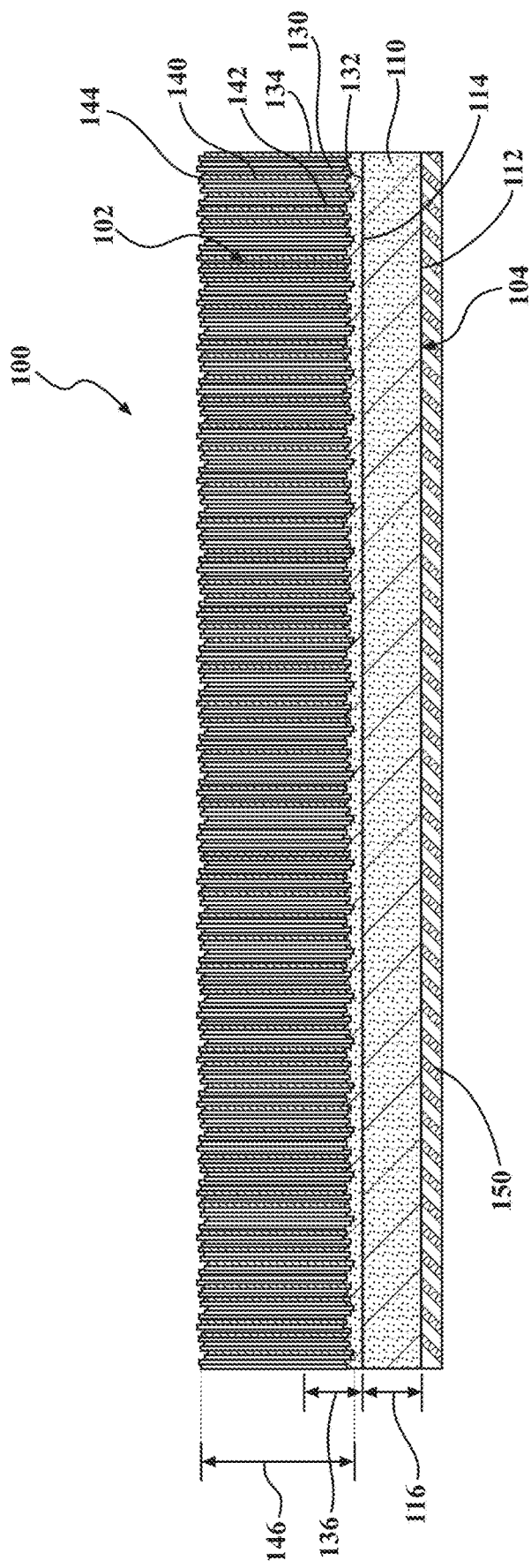
FIG. 3 is a partial cross sectional view of a second example carbon flocked tape.

FIGS. 2 and 3 are partial cross sectional views of examples of the tape 100 of FIG. 1 taken along the line 2-2. In one or more arrangements, the tape 100 can include a first adhesive 110, a substrate 120, a second adhesive 130, and fibers 140 as shown in FIG. 2. Alternatively or in addition, the tape 100 can include the first adhesive 110, the second adhesive 130, and fibers 140 as shown in FIG. 3. In such arrangements, the substrate 120 can be the first adhesive 110. As shown in FIGS. 2 and 3, the first adhesive 110 can at least partially define the inner surface 104 of the tape 100 and allow the tape 100 to be connected to a desired surface. The fibers 140 can at least partially define the outer surface 102 of the tape 100 and provide the desired flocked surface. In one or more arrangements, the substrate 120 and the second adhesive 130 can be located between the first adhesive 110 and the fibers 140 as shown.

The first adhesive 110, or attachment adhesive, can be any suitable adhesive for attaching the tape 100 to another object or surface. In one or more arrangements, the first adhesive 110 can be a pressure-sensitive adhesive (PSA). For instance, the first adhesive 110 can allow for operative connection of the tape 100 without the use of heat or solvents. Alternatively or in addition, the first adhesive 110 can have other suitable configurations. For example, the first adhesive 110 can include water activated adhesives and/or heat sensitive adhesives.

In one or more arrangements, the first adhesive 110 can have an inner surface 112 and an outer surface 114. The inner surface 112 can at least partially include the inner surface 104 of the tape 100 and be configured to contact a surface that the tape 100 is connected to. The outer surface 114 of the first adhesive can be configured to be in contact with the substrate 120. The first adhesive 110 can have a thickness as represented by reference number 116. For instance, the first adhesive 110 can have an average thickness of from about 0.05 millimeters (mm) to about 0.10 mm. In one or more arrangements, the thickness 116 of the first adhesive 110 can be substantially constant. Alternatively, the thickness 116 of the first adhesive can vary in one or more locations, or the thickness 116 of the first adhesive 110 can continuously vary across the tape 100 in one or more directions.

The first adhesive 110 can include any combination of suitable materials. In one or more arrangements, the first adhesive 110 can include a polymer. For example, the first adhesive 110 can include any combination of an acrylate polymer, natural rubber, and/or synthetic rubber. In one or more arrangements, the first adhesive 110 can include a tackifier, such as a resin, to increase the tack or stickiness of the first adhesive 110. In some arrangements, a removable liner 150 can be provided at the inner surface 112 of the first adhesive 110. The removable liner 150 can protect and/or preserve the first adhesive 110 when the tape 100 is not in use. For example, the removable liner 150 can reduce exposer of the first adhesive 110 to air, preventing the first adhesive from losing moisture or otherwise drying out. The removable liner 150 can be removed prior to operative connection of the tape 100 to another surface.

The first adhesive 110 can be selected for the tape 100 based on connection characteristics. In one example, the first adhesive 110 can be used that allows the flocked tape to be substantially permanently connected and to quickly adhere to the surface of an object. For example, the first adhesive 110 can be configured to set with a surface under a minute. This example embodiment may be beneficial where shorter manufacturing time is important. In another embodiment, the first adhesive 110 can be used that allows the flocked tape to be moved or rearranged on the surface of the object before the carbon flocked tape "sets" and more firmly adheres to the surface of the object. For example, the first adhesive 110 can be configured to set after a period longer than about a minute. This example embodiment may be beneficial where the carbon flocked tape typically needs to be moved or rearranged before completion. In some arrangements, the first adhesive 110 can be used allows the carbon flocked tape to be removable from the surface of the object when so desired, but can still keep the carbon flocked tape adhered to the surface of the object in normal uses of the tape. This example embodiment may be useful for constructing prototypes of a flocked surface. The person constructing a prototype can remove and apply flocking tape as desired.

As shown in FIG. 2, the tape 100 can include the substrate 120 which can have any suitable configuration. The substrate 120 can give shape to the tape 100 and/or provide structure for the fibers 140 to be applied to. As used herein, "substrate" can refer to any layer of the tape 100 located between the inner surface 112 and the second adhesive 130. In one or more arrangements, the substrate 120 can provide strength to the tape 100. For example, the substrate 120 may resist breaking and/or tearing. In one or more arrangements, the substrate 120 can have an inner surface 122 and an outer surface 124. The inner surface 122 of the substrate 120 can be configured to be in contact the outer surface 114 of the first adhesive 110. The outer surface 124 of the substrate 120 can be configured to be in contact with the second adhesive 130 and/or the fibers 140.

The substrate 120 can have a thickness as represented by reference number 126. For instance, the substrate 120 can have an average thickness of from about 0.03 mm to about 0.10 mm. In one or more arrangements, the thickness 126 of the substrate 120 can be substantially constant. Alternatively, the thickness 126 of the substrate 120 can vary in one or more locations, or the thickness 126 of the substrate 120 can continuously vary across the tape 100 in one or more directions.

In one or more arrangements, the substrate 120 can be include a metal. For instance, the substrate 120 can be a metal foil. Non-limiting examples of metal foils can include copper, aluminum, stainless steel, and/or other metal alloys. Based on the particular metal, the substrate 120 can be configured to conduct heat and/or electricity.

Alternatively, the substrate 120 can be configured to be an insulator against heat and/or electricity. In one or more arrangements, the substrate 120 can be formed from non-metallic materials, such as plastics and/or kraft liners. Kraft liners can include any material formed from a kraft process (also known as kraft pulping or sulfate processing). In one or more arrangements, the substrate can be a polymer, such as a plastic and/or rubber film.

The substrate 120 can have any other desired attributes based on specific applications for the tape 100. For instance, the substrate 120 can include features to aid in cutting, tearing, breaking, or otherwise changing the shape and/or size of the tape 100. The substrate 120 can include one or more areas of reduced material thickness. For example, the substrate 120 can include one or more reduced strength areas (e.g. a perforated line or shape formed in the substrate 120).

In one or more arrangements, the first adhesive 110 and the substrate 120 can be provided together. For instance, the first adhesive can be pre-applied to the substrate 120. Alternatively or in addition, the first adhesive 110 can act as the substrate 120, shown in FIG. 3. In some arrangements, the first adhesive 110 and the substrate 120 can be any suitable commercially available tape. Some non-limiting examples of commercially available tapes can include: an embossed copper foil tape, such as the 1245 Tape produced by 3M, the 330X Extreme Weather Foil Tape or 322 Multi-Purpose Foil Tape produced by NASHUA TAPE PRODUCTS, and the 467MP Adhesive Transfer Tape produced by 3M.

The second adhesive 130, or flocking adhesive, can be any suitable adhesive for retainably engaging the fibers 140. As used herein, "retainably engaging" can include any arrangements that allow for at least one end of the fibers 140 to be connected within the tape 100 in a substantially fixed position relative to the substrate 120. In one or more arrangements, the second adhesive 130 can be a PSA. For instance, the second adhesive 130 can allow for operative connection of the fibers 140 without the use of heat or solvents. Alternatively or in addition, the second adhesive 130 can have other suitable configurations. For example, the second adhesive 130 can include water activated adhesives and/or heat sensitive adhesives. Additionally, the second adhesive 130 can be achieved through heating and/or melting a material. For example, the substrate 120 can be heated to partially melt the outer surface 124 to allow the fibers 140 to be retainably engaged by the substrate upon the outer surface 124 solidifying. The second adhesive 130 can also include materials used in welding, brazing, and soldering processes. For example heat can be applied to a base material using such processes to allow retainable engagement of the fibers 140 with the base material. In some arrangements, the second adhesive 130 can be configured to withstand high temperatures after the fibers 140 are retained in the tape 100. For example, the second adhesive 130 can be configured to withstand temperatures up to about 1200 degrees Celsius.

In one or more arrangements, the second adhesive 130 can have an inner surface 132 and an outer surface 134. The inner surface 132 can be configured to be in contact with the outer surface 124 of the substrate 120. In one or more arrangements, the second adhesive can be configured to receive a first end region 142 of the fibers 140. For instance, the first end region 142 of the fibers 140 can be retainably engaged between the inner surface 132 and the outer surface 134.

The second adhesive 130 can have a thickness as represented by reference number 136. For instance, the second adhesive 130 can have an average thickness of from about 0.05 mm to about 0.10 mm. In one or more arrangements, the thickness 136 of the second adhesive 130 can be substantially constant. Alternatively, the thickness 136 of the second adhesive 130 can vary in one or more locations, or the thickness 136 of the second adhesive 130 can continuously vary across the tape 100 in one or more directions.

The second adhesive 130 can include any combination of suitable materials. In one or more arrangements, the second adhesive 130 can be a polymer. For example, the second adhesive 130 can include any combination of an acrylate polymer, natural rubber, and/or synthetic rubber. The second adhesive 130 can be silicon based, metal based, polymer based, thermoplastic, thermoset, acrylic based, and/or water solvent based, just to name a few examples. In one or more arrangements, the second adhesive 130 can include a tackifier, such as a resin, to increase the tack or stickiness of the second adhesive 130.

In one or more arrangements, the fibers 140 can be carbon fibers. As used herein, "carbon fibers" can include any fibers being comprised of mostly carbon atoms. The carbon fiber can include many individual carbon filaments held together by a coating, such as polyethylene oxide (PEO) or polyvinyl alcohol (PVA). The fibers 140 can be formed using any suitable methods of production. Carbon fibers 140 can be prepared from carbon fiber precursors, such as coal tar pitch, petroleum pitch, for example. In one or more arrangements, fibers 140 can be recycled carbon fibers. For instance, the fibers 140 can be recycled using material reclaimed from end of life parts made with carbon fibers. The fibers 140 can be reclaimed through any suitable recycling process. In some arrangements, the carbon fibers can be milled carbon fibers.

The size, shape, orientation, and/or density of the fibers 140 can be based on one or more factors, including, for example, design, space, and/or material considerations or constraints. In one or more arrangements, the fibers 140 can have any suitable size and shape. For instance, the fibers 140 can have a substantially cylindrical shape. In one or more arrangements, the fibers can have an average diameter of from about 0.005 mm to about 0.007 mm. Other configurations of the fibers 140 are contemplated. For example, the fibers 140 can have other non-cylindrical shapes. Further, the dimensions of the fibers 140 (e.g., diameter) can vary based on the application. In one or more arrangements, the fibers 140 can be located at substantially the entire surface area of the tape 100. Alternatively, the fibers 140 can be located at select areas along the tape 100.

The fibers 140 can have any suitable length. In one or more arrangements, an average length 146 of the fibers 140 can be any length less than about 0.5 mm. For instance, the average length 146 can be any length from about 0.06 mm to about 0.15 mm. For example, the average length 146 of the fibers 140 can be 0.08 mm, 0.10 mm, 0.12 mm, or 0.15 mm. In one or more arrangements, the average length 146 of the fibers 140 can be substantially constant. Alternatively, the average length 146 of the fibers 140 can vary in one or more locations, or the average length 146 of the fibers 140 can continuously vary across the tape 100 in one or more directions. For example, the fibers 140 can have varying lengths listed above.

The fibers 140 can be connected within the tape 100 such that the tape 100 has any suitable density of the fibers 140. As used herein, "density" can refer to the amount of fibers 140 present in the tape 100 for a particular surface area of the second adhesive 130 and/or the substrate 120. In one or more arrangements, the density of the fibers 140 can be substantially constant. Alternatively, the density of the fibers 140 can vary in one or more locations, or the density of the fibers 140 can continuously vary across the tape 100 in one or more directions.

The fibers 140 can have any suitable orientation relative to one or more other elements of the tape 100. For instance, the fibers 140 can be oriented at an angle relative to the substrate 120. In one or more arrangements, the fibers 140 can be orientated substantially perpendicular to the substrate 120, as shown in FIG. 3. As used herein, the term "substantially" includes exactly the term it modifies and slight variations therefrom. Thus, "substantially perpendicular" can include any arrangements wherein the fibers 140 are exactly perpendicular to the substrate, and slight variations from perpendicular. For example, the fibers 140 can outwardly extend from the first end region 142 to the second end region 144 at substantially 90 degrees relative to the outer surface 124 of the substrate 120. In one or more arrangements, the fibers 140 can be oriented at different angles relative to the substrate 120. For example, the fibers 140 can extend at any angle between substantially 90 degrees and substantially parallel to the substrate 120. In one or more arrangements, the orientation of the fibers 140 is substantially constant. For instance, each of the fibers 140 are orientated in substantially the same manner.

In one or more arrangements, the fibers 140 can have varying orientations along the tape 100. For instance, the fibers 140 can extend in different directions and/or relative angles to the substrate 120. In one or more arrangements, and shown in FIGS. 2 and 4, the fibers 140 can have a substantially random and/or substantially undirected orientation. As used herein, "random directions" or "random orientation" includes orientation of the fibers 140 without apparent aim, reason, or pattern. "Undirected orientation" can include any orientation of the fibers 140 in which individual fibers lack a uniform direction. For instance, the fibers 140 can have a random orientation if individual fibers are angled relative to the substrate 120 and/or the first adhesive 110 at varying degrees.

In some arrangements, the fibers 140 can overlay or cover a substantial majority of the second adhesive 130. As used herein, the fibers 140 can "cover" or "overlay" portions of the second adhesive 130 such that an imaginary line extending outward from the outer surface 134 of the second adhesive 130 would intersect one or more fibers. For instance, the imaginary line can be substantially perpendicular to the outer surface 134. "Substantial majority" can include at least about 60%, at least about 70%, at least about 80%, at least about 90%, at least about 95%, at least about 96%, at least about 97%, at least about 98%, at least about 99%, and/or about 100% of the surface area of the tape 100.

In one or more arrangements, the fibers 140 can be configured to conduct electric and/or thermal energy. In arrangements in which the substrate 120 is conductive, the fibers 140 can be configured to be in electrical and/or thermal communication with the substrate 120. For instance, the fibers 140 can be arranged such that the first end region 142 of one or more fibers 140 is in direct contact with the substrate 120. Alternatively or in addition, the second adhesive 130 can be configured to allow for electrical and/or thermal communication between the fibers 140 and the substrate 120. For example, the second adhesive 130 can be configured to conduct electric and/or thermal energy.

Figure 4:
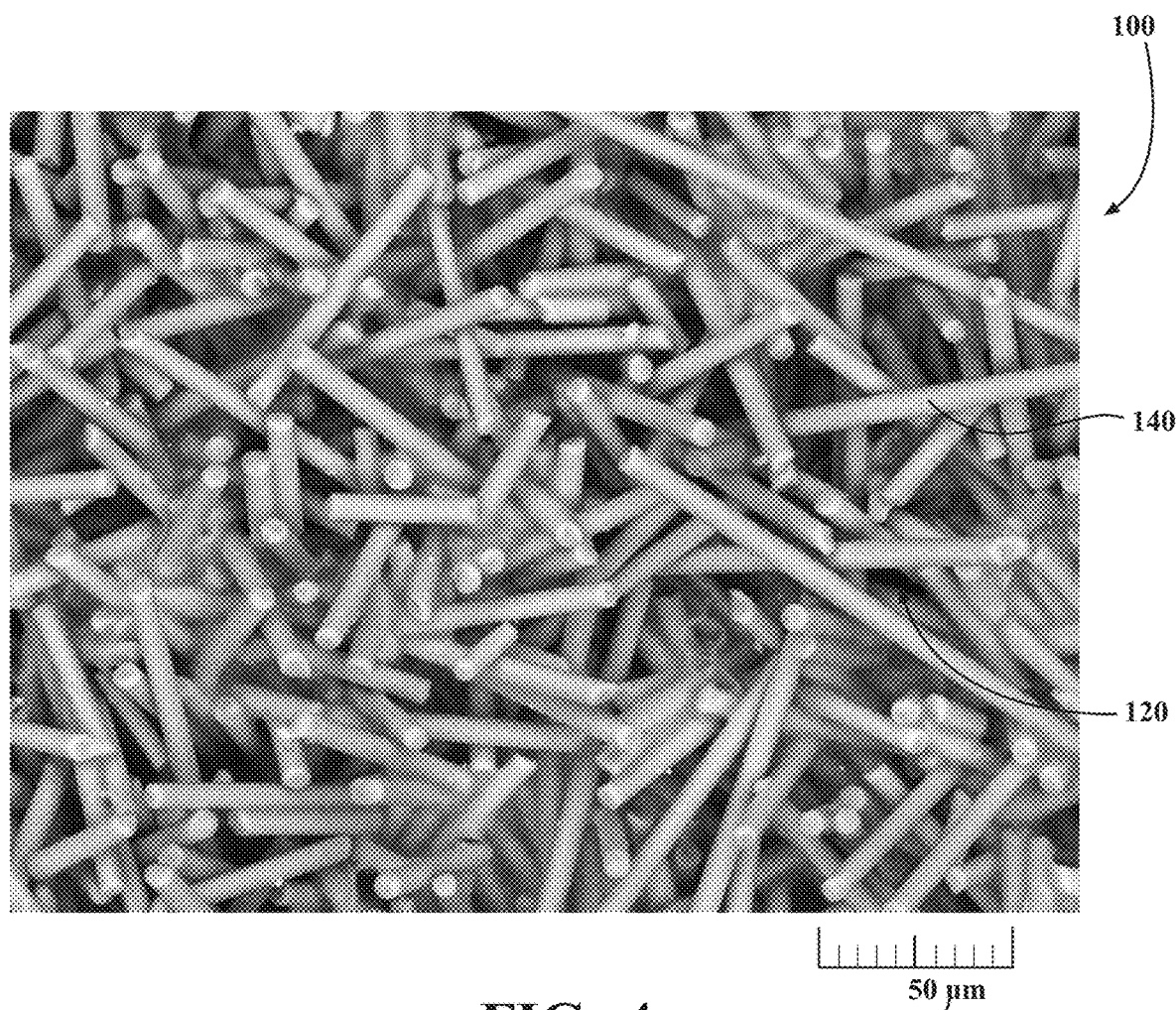
FIG. 4 is a magnified image illustrating an example of the carbon flocked tape of FIG. 1.

In one or more arrangements, the tape 100 can be configured to insulate against electric and/or thermal energy. The tape 100 can reduce and/or prevent electrical or thermal energy from being transferred between materials located near opposite sides of the tape 100. The first adhesive 110, the substrate 120, the second adhesive 130, and/or the fibers 140 can be made from insulating materials. In one or more arrangements, the orientation of the fibers 140 can affect the insulating properties of the tape 100. For example, fibers having substantially random orientations that overlay portions of the tape 100 (examples are shown in FIGS. 2 and 4) can allow for increased electrical and/or thermal insulation.

In one or more arrangements, the tape 100 can act as a fire retardant in certain applications. As used herein, "fire retardant" includes any ability to prevent or delay the combustion, burning, melting, or other destruction of a substance due to high heat and/or fire. In some arrangements, the tape 100 can be a fire retardant that acts as a protective layer that prevents or delays an underlying material from igniting. For example, the tape 100 can delay the melting and/or burning of a material that the tape is applied to. In one or more arrangements, the tape 100 can act as a fire retardant due to the characteristics of one or more of the first adhesive 110, the substrate 120, the second adhesive 130, and/or the fibers 140.

In one or more arrangements, the tape 100 can act as a shield for radiation within the electromagnetic spectrum. As used herein, "shield" can include any ability of the tape 100 to prevent, alter, and/or reduce the propagation of any form of radiation. "Radiation" includes the transmission of energy in the form of waves or particles through space or through a material medium. The electromagnetic spectrum can include radiation having wavelengths ranging from extremely low frequency (ELF) waves to gamma rays. In one or more arrangements, the tape 100 can shield one or more components from microwave radiation having wavelengths from about one meter to about one millimeter. In some arrangements, the tape 100 can shield one or more components from radio wave radiation having wavelengths from about one meter to about 100 km. For example, the tape 100 can shield one or more components from cell phone, Wi-Fi, microwave ovens, satellite, and/or radar signals. In one or more arrangements, the tape 100 can shield components from radiation due to the characteristics of one or more of the first adhesive 110, the substrate 120, the second adhesive 130, and/or the fibers 140. For example, the length, density, thickness, and/or orientation of the fibers 140 can be chosen to shield one or more types of radiation described above.

The fibers 140 can be connected to the second adhesive 130 using any suitable method. For instance, the fibers 140 can be flocked to the substrate 120 using any known flocking process. In one or more arrangements, the fibers 140 can be deposited using electrostatic flocking processes. For instance, an electric charge can be used to orient the fibers 140 and promote a particular alignment. In some arrangements, an electrode is used to charge the fibers 140. A grounded electrode can be positioned at an opposite side of the tape 100 (such as near the inner surface 104). The fibers 140 can move toward the grounded electrode and can be adhered in the second adhesive 130 at any desired orientation relative to the substrate 120. In one or more arrangements, the use of higher voltage charges can result in random orientations of the fibers 140.

Figure 5A:
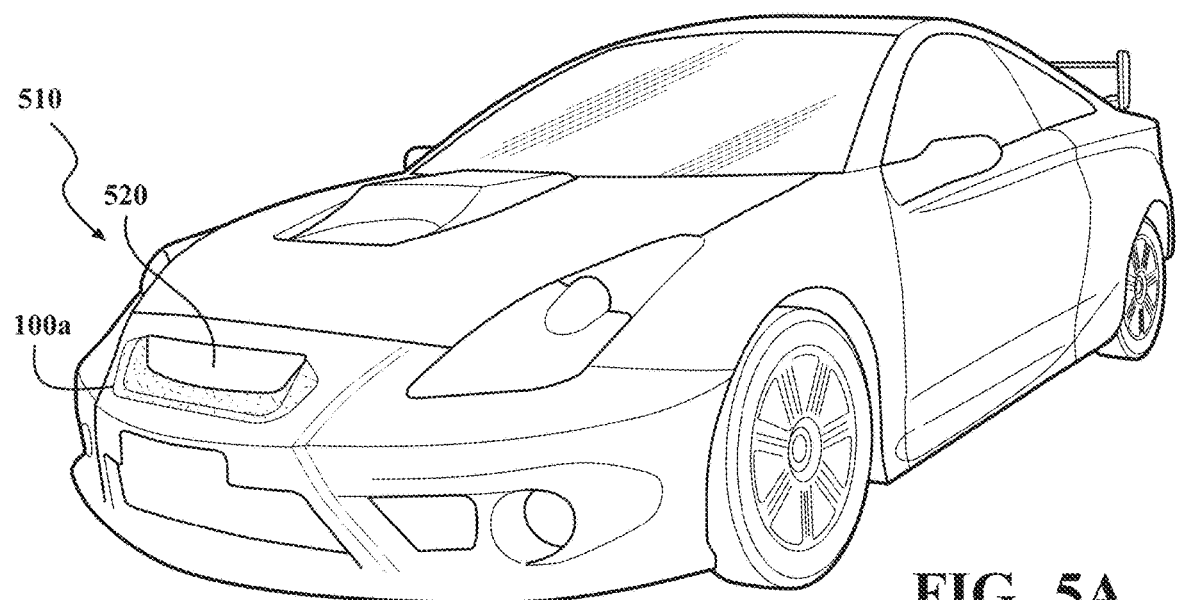
FIG. 5A is a first example illustration of a vehicle with carbon flocked tape applied.
Figure 5B:
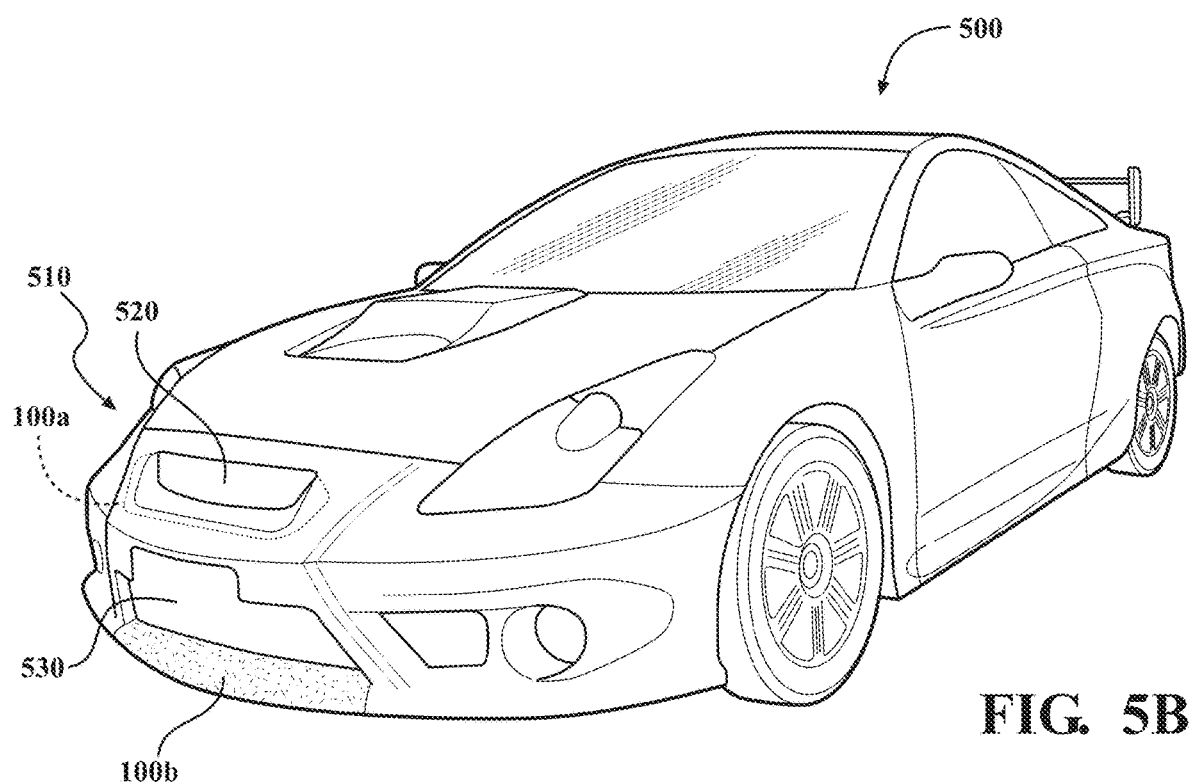
FIG. 5B is a second example illustration of the vehicle in which the flocked carbon tape is removed and reapplied.

Non-limiting example applications of the flocked tape will now be described. Referring to FIGS. 5A and 5B, the tape 100 can be connected to portions of a vehicle 500. As used herein, "vehicle" means any form of motorized transport. In one or more implementations, the vehicle can be an automobile. While arrangements will be described herein with respect to automobile assemblies, it will be understood that embodiments are not limited to automobile assemblies. In some implementations, the vehicle can be a watercraft, an aircraft, a spacecraft, or any other form of transport. In one or more arrangements, the vehicle 500 can include a front 510 having one or more openings or vents. For instance, the front 510 can include a first inlet 520 and/or a second inlet 530.

The first inlet 520 and/or the second inlet 530 can be configured to achieve a variety of purposes, such as cooling vehicle components. In one or more arrangements, the first inlet 520 and/or the second inlet 530 can allow air to flow near any mechanical or electrical systems. For example, the first inlet 520 and/or the second inlet 530 can allow air to enter the front 510 of the vehicle 10 to contact a radiator (not shown) to aid in the cooling of engine components. Further, the first inlet 520 and/or the second inlet 530 can allow air to be directed to other vehicle components, such as vehicle brakes and/or wheels.

In one or more arrangements, it can be desirable to change, alter, or influence fluid flow proximate to the vehicle 500. As used herein, "fluid flow" can include any movement of gas or liquid. For example, it can be desirable to influence the fluid flow around the vehicle to improve aerodynamics. For purposes of this example, the tape 100 can be used to improve air flow characteristics at the front 510 of the vehicle 500.

As shown in FIG. 5A, the tape 100 can be connected to the vehicle 500 at a first tape location 100a. For example, the first tape location 100a can be an area of the vehicle 500 near the first inlet 520. For example, in some arrangements, it may be desirable to add the tape 100 below the first inlet 520 to improve air flow into the first inlet 520. The first adhesive 110 of the tape 100 can operatively connect the tape 100 to the vehicle 10 by adhering to a surface of the vehicle 10 at the first tape location 100a. The outer surface 102 of the tape 100, including fibers 140, can face away from the surface of the vehicle 500.

The characteristics of the tape 100 can be chosen based on desired improvements. For example, the length, size, and/or density of the fibers 140 can be chosen based on correlated fluid dynamics. Further, the size, shape, and/or material of the substrate 120 can be chosen based on any factors, such as thermal and/or electrical conduction. In one or more examples, the characteristics of the tape 100 can be chosen as a result of physical and/or virtual testing.

In one or more arrangements, it may be desirable to change the application of tape 100. For instance, testing can reveal it is desirable to change the fluid flow characteristics near the front 510 of the vehicle 500. In one or more arrangements, the tape 100 can be configured to be removable from an adhered surface. For example, the tape 100 can be configured to be removable from the first tape location 100a of the vehicle 500.

In one or more arrangements, the tape 100 can be configured to allow for operative connection of the tape 100 to a second surface subsequent to removal from a first surface. For instance, the tape 100 can be connected to a second tape location 100b, as shown in FIG. 5B. For example, the second tape location 100b can be an area of the vehicle 500 near the second inlet 530. For example, in some arrangements, it may be desirable to add the tape 100 below the second inlet 530 to improve air flow into the second inlet 530. The first adhesive 110 of the tape 100 can operatively connect the tape 100 to the vehicle 10 by adhering to a surface of the vehicle 500 at the second tape location 100b. The outer surface 102 of the tape 100, including fibers 140, can face away from the surface of the vehicle 500.

Figure 6:
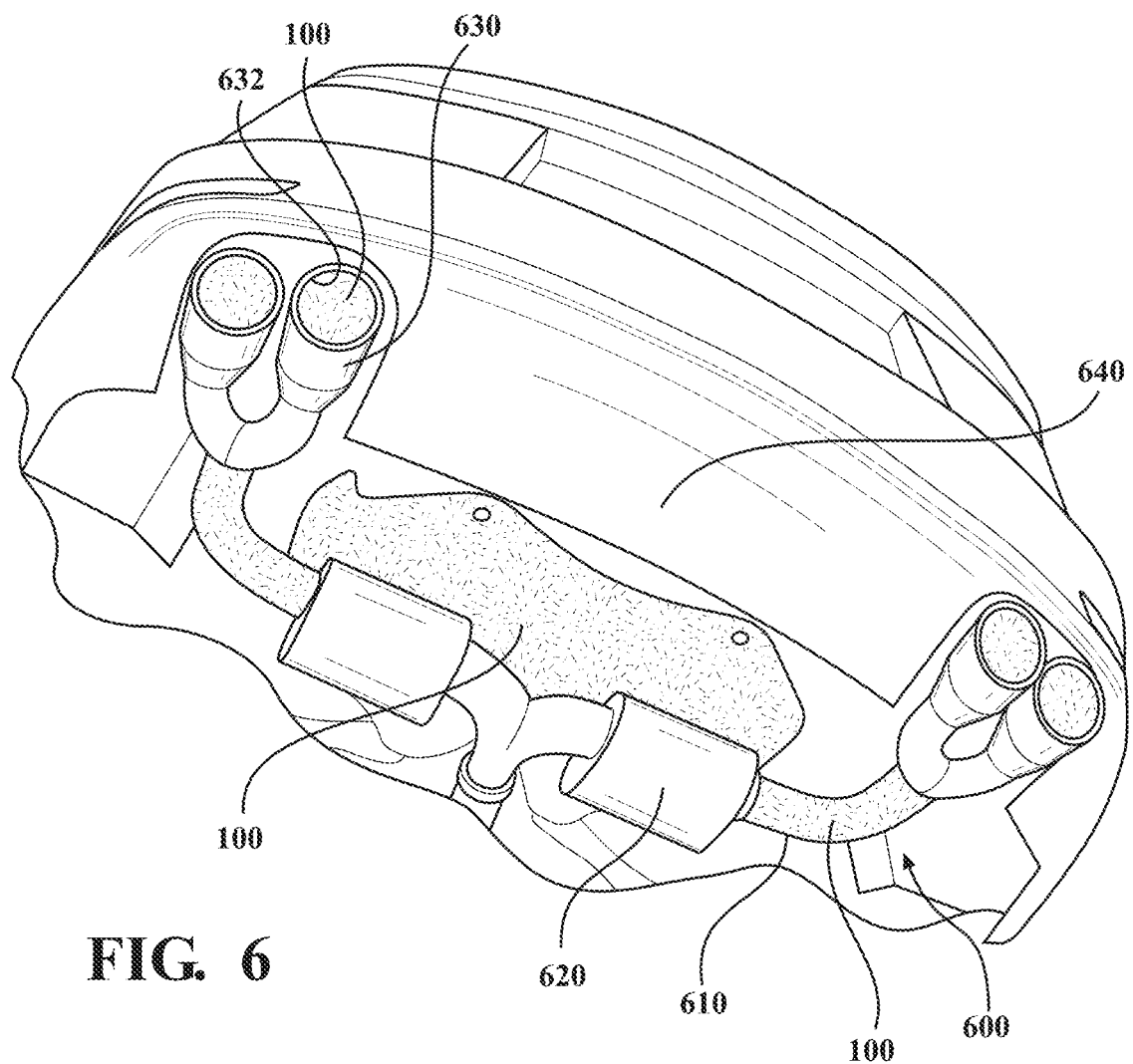
FIG. 6 is an illustration showing a vehicle exhaust system with carbon flocked tape applied.

In another non-limiting example shown in FIG. 6, the tape 100 can be applied to a vehicle exhaust system 600. The vehicle exhaust system 600 can include one or more exhaust pipes 610, one or more mufflers 620, and one or more exhaust tips 630 located near a vehicle floor 640. The components of the exhaust system 300 can be in fluid communication with an engine exhaust to allow hot gas rejected from the engine to be intruded into the environment outside of the vehicle.

In one or more arrangements, the tape 100 can be applied to one or more surfaces of one or more elements of the vehicle exhaust system 600 for sound and/or thermal insulation. For instance, the tape 100 can be applied to inner and/or outer surfaces of the exhaust pipes 610, the muffler(s) 620, the exhaust tips 630, and/or the vehicle floor 640. As shown in FIG. 6, the tape 100 can be applied to an outer surface of the exhaust pipes 610 and/or an inner surface 632 of the exhaust tips 630. In arrangements in which the tape 100 is applied to an inner surface of an exhaust component, the tape 100 can allow for easier exhaust flow through the vehicle exhaust system 600. This can, for example, increase fuel economy or performance of the vehicle.

Figure 7:
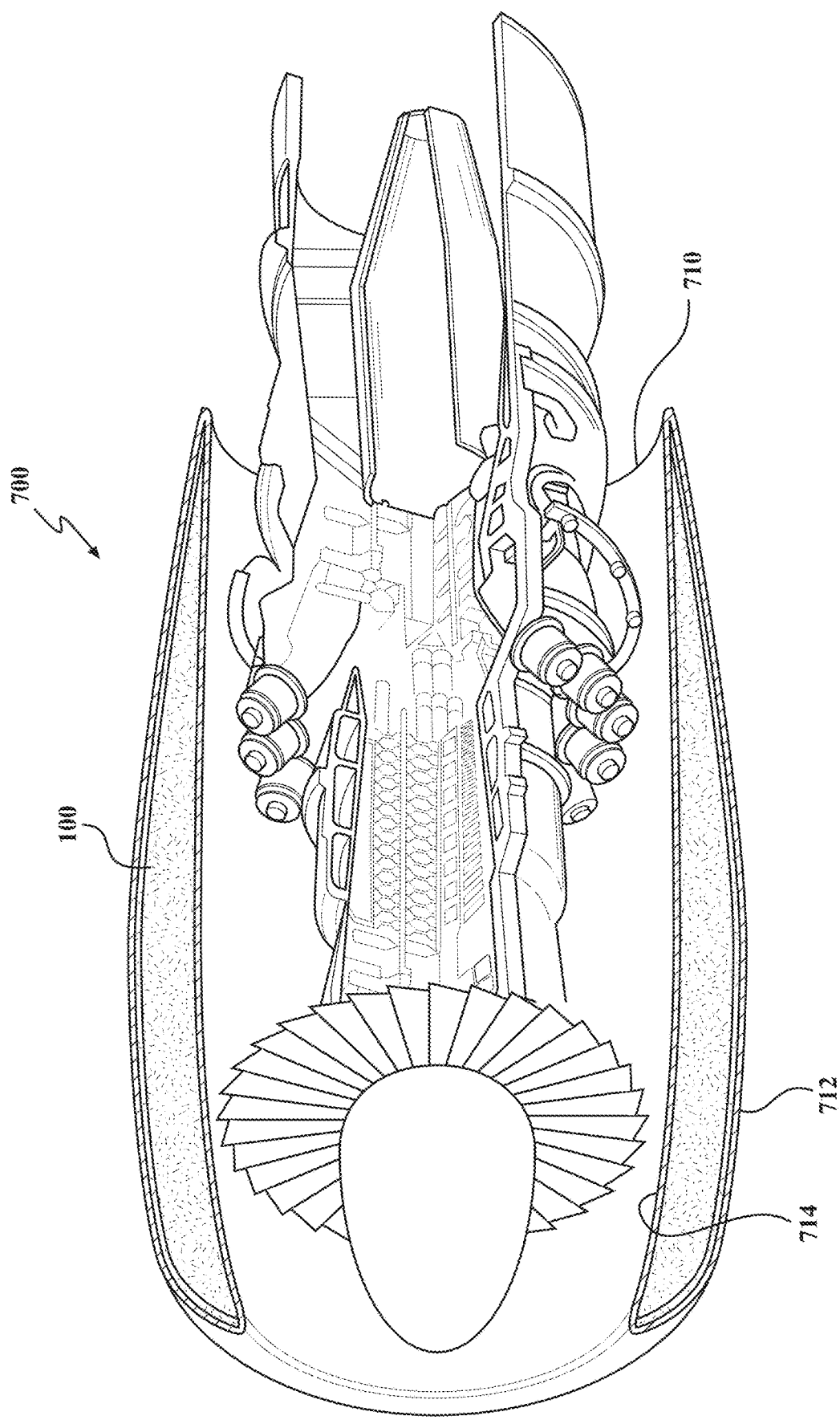
FIG. 7 is an illustration showing a turbine engine system with carbon flocked tape applied.

In another non-limiting example, the tape 100 can be applied to engines, such as a jet engine system 700 shown in FIG. 7. In some arrangements, the jet engine system 700 can include a turbine engine surrounded by a housing 710. The housing 710 can include an outer wall 712 and an inner wall 714. In one or more arrangements, the tape 100 can be applied to one or more surfaces of the outer wall 712 and/or the inner wall 714. For example, the tape 100 can be applied to an inner surface of the outer wall 712. The tape 100 can provide thermal insulation to the housing 710. For example, the tape 100 can cause less heat to transfer from the turbine engine through the housing 710. Further, the tape 100 can provide noise insulation, reducing the amount of sound coming out of the housing 710.

In one or more arrangements, thermal insulation provided by the tape 100 can allow portions of the housing to be formed from different materials. For instance, the tape 100 can provide thermal insulation such that the outer wall 712 can be formed from a material that would otherwise not perform well enough during hotter conditions. As an example, the outer wall 712 can be formed from a lighter-weight plastic or composite material having a melting point below that of a metal.

Figure 8A:
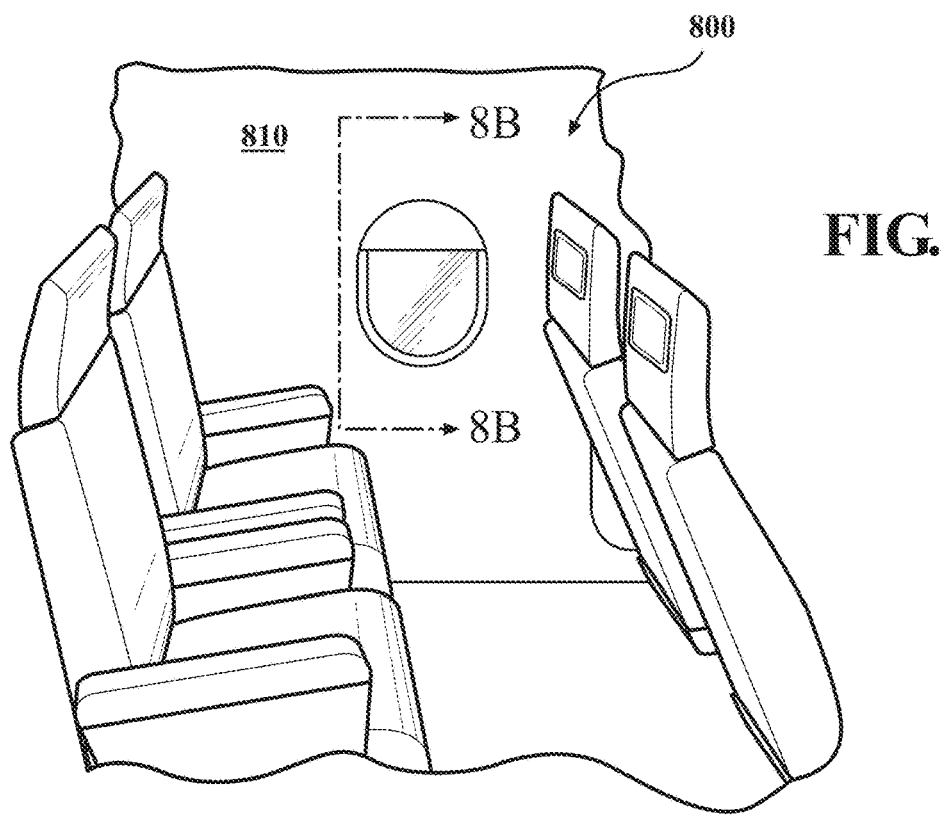
FIG. 8A is an illustration showing an airplane wall panel.
Figure 8B:
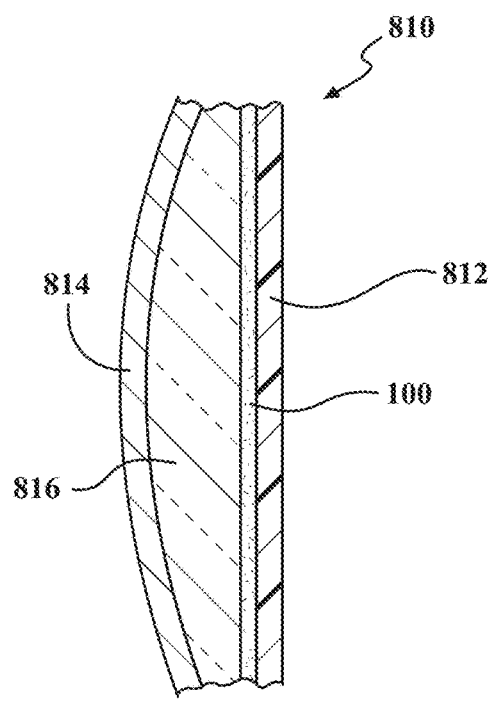
FIG. 8B is a partial cross sectional view of the example airplane wall panel of FIG. 8A taken along the line 8-8 with carbon flocked tape applied.

In one or more arrangements, the tape 100 can be applied to a variety of walls, panels, dividers, and/or other structure within vehicles. For instance, the tape 100 can be applied to panels within an airplane 800. In a non-limiting example, as shown in FIGS. 8A and 8B, the tape 100 can be applied to a wall panel 810 of the airplane 800. The wall panel 810 can be an outer wall of the airplane as shown in FIG. 8A. Alternatively or in addition, the wall panel 810 can be an interior wall or divider. For example, the wall panel 810 can be a divider, wall, or door that separates one or more areas of an airplane (e.g., cockpit, first-class, economy class, etc.).

As shown in the partial cross-sectional view of FIG. 8B, in one or more arrangements, the wall panel 810 can include an inner panel 812, an outer panel 814, and/or insulation 816. The insulation 816 can be located between the inner panel 812 and the outer panel 814, and can have any suitable configuration and be formed from any suitable material. In some arrangements, the tape 100 can be applied to one or more surfaces of the inner panel 812 and/or the outer panel 814. In the non-limiting example of FIG. 8B, the tape 100 can be applied to an inside-facing surface of the inner panel 812, the inside-facing surface facing an interior of the wall panel 810. In some arrangements, the tape 100 can provide thermal and/or sound insulation for the wall panel 810. In some cases, the addition of the tape 100 can allow less use of, or removal of, the insulation 816. In one or more arrangements, the tape 100 can provide fire retardant benefits to the wall panel 810. For instance, the tape 100 can prevent and/or slow the spread of fire through portions of the wall panel 810.

In one or more arrangements, the tape 100 can shield areas of an airplane from one or more sources of electromagnetic radiation. For example, the tape 100 located at the wall panel 810 can shield portions of the airplane from one or more cellular, Wi-Fi, and/or other communication signals. As non-limiting examples, the wall panel 810 can be positioned between first-class and economy class and/or a cabin and cockpit.

Other non-limiting examples for applications of the tape 100 include operative connection to fuel delivery systems, air intakes, fan components, and other vehicular or non-vehicular applications. In some arrangements, the tape 100 can be applied to fan blades. The flocked outer surface 102 of the tape 100 can reduce flow separation of a fluid over the surface of the fan blade. Further, the tape 100 can reduce drag on the fan blades which can lead to reduced energy consumption and/or reduced noise. Further, the tape 100 can be used in any application in which protection from fire, heat, electricity, and/or radiation is desired.

Figure 9:
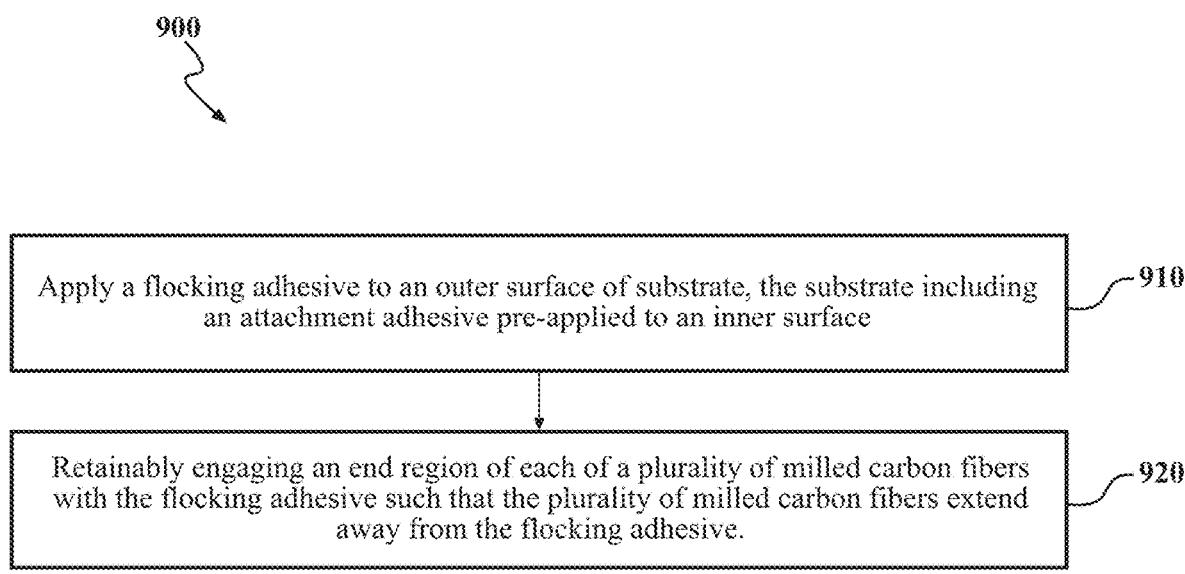
FIG. 9 example of a method for forming carbon flocked tape.

Now that various potential systems, devices, elements and/or components have been described, various methods for forming the tape 100 will now be described. Referring to FIG. 9, one example of a method for forming the tape 100 is shown, and various possible steps for method 900 will now be described. The method 900 can be applicable to the arrangements described herein and in the Figures, but it is to be understood that the method 900 can be carried out with other suitable systems. Additionally, the method 900 can include other steps that are not shown here, and the method 900 is not limited to including every step shown in FIG. 9. The steps that are illustrated here as part of the method 900 are not limited to this particular chronological order. Indeed, some of the steps can be performed in a different order than what is shown and/or at least some of the steps shown can occur simultaneously.

At block 910, a second adhesive can be applied to a second side of the tape. In one or more arrangements, the tape 100 can include a substrate and a first adhesive. The first adhesive can be pre-applied to a first side of the tape. For example, the tape 100 can include the first adhesive 110 at least partially defining the inner surface 104 of the tape 100. As described above, the first adhesive 110 can be any suitable adhesive to provide desired characteristics for connecting the tape 100 to a target surface. In one or more arrangements, the second adhesive 130 can be applied to the outer surface 124 of the substrate 120.

At block 920, a first end region of a plurality of milled carbon fibers can be retainably engaged with the second adhesive. The plurality of milled carbon fibers can extend away from the second adhesive to a distal end. For example, the fibers 140 can include a first end region 142 that is retained in the flocking second adhesive 130. Further, the fibers 140 can extend from the first end region 142 to a second end region 144 distal to the first end region 142. In one or more arrangements, the fibers 140 can be retainably engaged with the second adhesive via an electrostatic process.

It will be appreciated that arrangements described herein can provided numerous benefits, including one or more of the benefits mentioned herein. Arrangements can provide a carbon fiber flocked tape that can be applied to a variety of surfaces. In some instances, the tape can be easily removed and/or reapplied. The flocked tape can provide desired fluid interaction by changing the fluid resistance of one or more components. Further, the tape can provide thermal and/or electrical insulation, fire retardation, and/or radiation shielding for one or more components.

As used herein, the terminology "example", "embodiment", "implementation", "aspect", "feature", "respect", or "element" indicate serving as an example, instance, or illustration.

Further, for simplicity of explanation, although the figures and descriptions herein can include sequences or series of steps or stages, elements of the methods disclosed herein can occur in various orders or concurrently. Additionally, elements of the methods disclosed herein can occur with other elements not explicitly presented and described herein. Furthermore, not all elements of the methods described herein can be required to implement a method in accordance with this disclosure.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B. In addition, the articles "a" and "an" as used in this application and the appended claims should generally be construed to mean "one or more" unless specified otherwise or clear from context to be directed to a singular form. Disclosure of ranges includes disclosure of all ranges and subdivided ranges within the entire range, including the endpoints.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A carbon flocked tape, comprising:
a substrate having an inner surface and an outer surface, the substrate having an average thickness from about 0.03 mm to about 0.10 mm;
a first adhesive applied to the inner surface of the substrate;
a second adhesive applied to the outer surface of the substrate; and
a plurality of carbon fibers, the plurality of carbon fibers having an average length from about 0.06 mm to about 0.15 mm, the plurality of carbon fibers having an average diameter of from about 0.005 mm to about 0.007 mm, each carbon fiber having a first end region and a second end region, the first end regions being retainably engaged with the second adhesive, the plurality of carbon fibers covering a substantial majority of the second adhesive, the second end regions extending away from the second adhesive, the plurality of carbon fibers having a random orientation such that the plurality of carbon fibers are oriented without apparent pattern.

2. The carbon flocked tape of claim 1, wherein the substrate comprises at least one of the group consisting of: aluminum, copper, and steel.

3. The carbon flocked tape of claim 1, wherein the substrate comprises at least one of a plastic film or a rubber film.

4. The carbon flocked tape of claim 1, wherein the first adhesive is a pressure sensitive adhesive (PSA).

5. The carbon flocked tape of claim 1, wherein the first adhesive allows the carbon flocked tape to be connected to a first surface, removed from the first surface, and re-connected to a second surface.

6. The carbon flocked tape of claim 1, wherein the carbon flocked tape is configured to act as a fire retardant.

7. The carbon flocked tape of claim 1, wherein the carbon flocked tape is configured to shield one or more waves within an electromagnetic spectrum.

8. A method for forming a carbon flocked tape, the method comprising:
applying a flocking adhesive to an outer surface of a substrate, the substrate including an attachment adhesive pre-applied to an inner surface, the substrate having an average thickness from about 0.03 mm to about 0.10 mm; and
retainably engaging an end region of each of a plurality of milled carbon fibers with the flocking adhesive such that the plurality of milled carbon fibers extend away from the flocking adhesive, the plurality of milled carbon fibers having an average length from about 0.06 mm to about 0.15 mm, the plurality of milled carbon fibers having an average diameter of from about 0.005 mm to about 0.007 mm, the plurality of milled carbon fibers covering a substantial majority of the flocking adhesive, the plurality of milled carbon fibers having a random orientation such that the plurality of milled carbon fibers are oriented without apparent pattern.

9. The method of claim 8, wherein the retainably engaging comprises using an electrostatic process to cause the plurality of milled carbon fibers to have the random orientation while engaging the flocking adhesive.

10. A vehicle panel system, the system comprising:
a vehicle panel defining an attachment surface; and
a carbon flocked tape operatively connected to the attachment surface, the carbon flocked tape comprising:
a substrate having an inner surface and an outer surface, the substrate having an average thickness from about 0.03 mm to about 0.10 mm;
a first adhesive applied to the inner surface of the substrate;
a second adhesive applied to the outer surface of the substrate; and
a plurality of carbon fibers, the plurality of carbon fibers having an average length from about 0.06 mm to about 0.15 mm, the plurality of carbon fibers having an average diameter of from about 0.005 mm to about 0.007 mm, each carbon fiber having a first end region and a second end region, the first end regions being retainably engaged with the second adhesive, the plurality of carbon fibers covering a substantial majority of the second adhesive, the second end regions extending away from the second adhesive, and the plurality of carbon fibers having a random orientation such that the plurality of carbon fibers are oriented without apparent pattern.

11. The vehicle panel system of claim 10, wherein the vehicle panel is a panel along an exterior of an automobile near a fluid inlet opening.

12. The vehicle panel system of claim 10, wherein the vehicle panel is an automobile exhaust component.

13. The vehicle panel system of claim 10, wherein the vehicle panel is part of a turbine engine housing.

14. The vehicle panel system of claim 10, wherein the vehicle panel is an airplane wall panel.

* * * * *